United States Patent
Lion et al.

(10) Patent No.: US 7,055,200 B2
(45) Date of Patent: Jun. 6, 2006

(54) MULTI-PURPOSE ICE TONGS

(75) Inventors: Mathieu Lion, Paris (FR); Lucas Bignon, Cachan (FR); Colin Field, Romainville (FR)

(73) Assignee: Mastrad SA, Paris (FR)

( * ) Notice: Subject to any disclaimer, the term of this patent is extended or adjusted under 35 U.S.C. 154(b) by 15 days.

(21) Appl. No.: 10/829,117

(22) Filed: Apr. 20, 2004

(65) Prior Publication Data
US 2004/0255388 A1 Dec. 23, 2004

(30) Foreign Application Priority Data
Dec. 14, 2001 (SE) .................................. 0104223

(51) Int. Cl.
B25F 1/00 (2006.01)
(52) U.S. Cl. .............................. 7/113; 7/132
(58) Field of Classification Search .................... 7/113, 7/118, 132, 142
See application file for complete search history.

(56) References Cited

U.S. PATENT DOCUMENTS

| | | |
|---|---|---|
| 2,601,766 A | 7/1952 | Riddell |
| 4,741,059 A | 5/1988 | Lee et al. |
| D298,600 S | 11/1988 | Dallaire |
| D311,306 S | 10/1990 | Gagnon |
| 5,009,006 A * | 4/1991 | Sawyer et al. ............... 30/90.6 |
| 5,062,192 A * | 11/1991 | Sawyer et al. ............. 29/426.4 |
| D392,849 S | 3/1998 | Zeller |
| D444,041 S | 6/2001 | Thuma |
| 6,276,734 B1 | 8/2001 | Krieger |
| 6,470,522 B1 * | 10/2002 | Veltz et al. .................... 7/128 |
| D480,278 S | 10/2003 | Jones |
| 2002/0088060 A1 * | 7/2002 | Veltz et al. .................... 7/128 |
| 2003/0234205 A1 * | 12/2003 | McGuyer et al. ........... 206/564 |
| 2004/0255388 A1 * | 12/2004 | Lion et al. ..................... 7/113 |
| 2005/0138736 A1 * | 6/2005 | Tarlow .......................... 7/110 |

* cited by examiner

*Primary Examiner*—Lee D. Wilson
(74) *Attorney, Agent, or Firm*—Cowan, Liebowitz & Latman, PC; Mark Montague

(57) ABSTRACT

A multi-purpose ice tongs includes a handle and a pair of tongs that extend from the handle and that collectively are able to pick-up an ice cube or other item typically used in the preparation of drinks. One of the tongs includes a grater surface for grating a food item. The multi-purpose ice tongs can also include a bottle opener that extends from the handle, a knife stored within the handle, and a zester component within the knife. The surface of the handle of the ice tongs may be utilized as an ice hammer, and one end of the handle is made of a suitable material to enable it to crush a food item contained within a drink glass without breaking the glass.

21 Claims, 2 Drawing Sheets

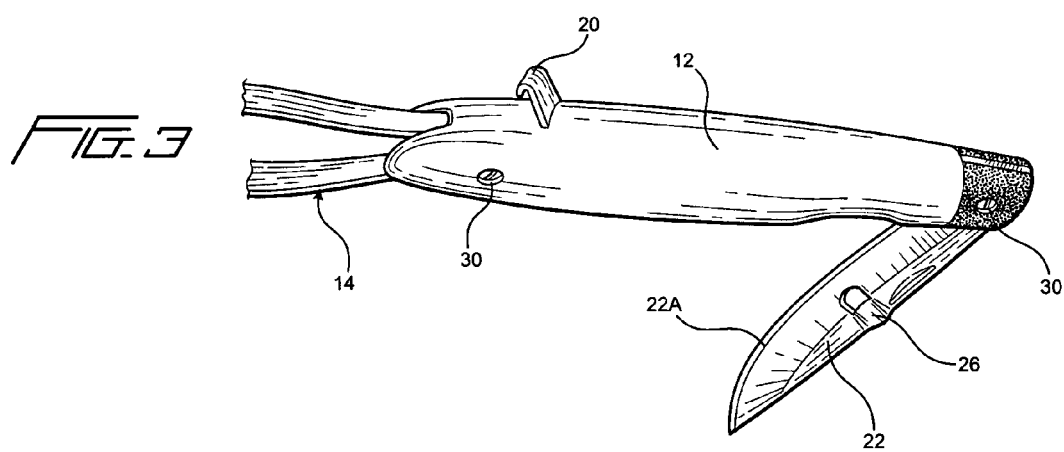
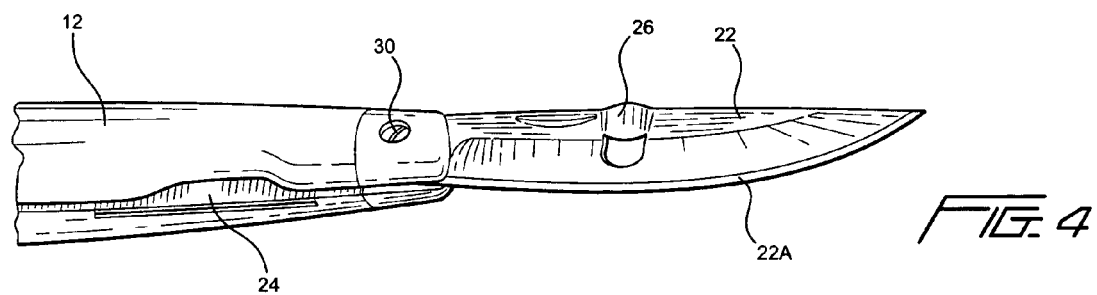

MULTI-PURPOSE ICE TONGS

FIELD OF THE INVENTION

The present invention relates to a multi-purpose ice tongs and, more particularly, to a pair of ice tongs for picking up an ice cube that is able to carry out other useful functions typically carried out during preparation and serving of drinks.

BACKGROUND OF THE INVENTION

A wide variety of ice tongs utilized for picking up ice cubes are available. Patented designs include those disclosed in U.S. Pat. Nos. D298,600; D444,041; and D392,849. A multitude of other designs exist, many of which are currently available.

A large variety of other types of tools utilized in food and drink related-applications have been proposed and are available for purchase. These include nutcrackers, zesters, bottle cap openers, cork screw openers, mellon-ballers, can openers, pizza cutters, meat thermometers. The list goes on and on. A few exemplary patents showing some devices include U.S. Pat. Nos. 2,601,766; D311,306; and D480,278. Many other patents disclosing other types of kitchen devices exist.

The field of useful tools for use in food and drink related services is rather large. In particular, for drink related services, namely, drink preparation services as performed by novice and professional bartenders, additional useful tools can still be made to improve upon the art.

OBJECTS AND SUMMARY OF THE INVENTION

It is therefore an object of the present invention to provide a multi-purpose tool that is useful in the field of drink preparation. It is a particular object to provide a multi-purpose set of tongs that can be utilized to pickup ice cubes for drinks and other purposes, and that has additional useful capability.

These objects are attained by a multi-purpose ice tongs comprising a handle, a pair of tongs that extend from the handle and that collectively are able to pick-up an ice cube, and one of the tongs has an grating surface for grating a food item.

As a feature of the invention, a bottle opener extends from the handle.

As another feature, a knife is coupled to and stored within a recess of the handle and can be pivotally withdrawn for use.

As yet another feature, the knife includes a zester component for removing a peel from a food item.

As a further feature, the handle includes a pillar at one end that is designed to crush food within a drink glass without breaking the glass.

Also in accordance with the present invention, an ice cube or other food item to be grated, crushed or shaved can be picked up and either crushed, grated or shaved by the multi-purpose ice tongs by first picking up the item with the tongs, and then crushing it with the handle being used as a hammer or sliding the picked up item between the tongs to a grating surface disposed on the interior surface of one of the tongs, and then either grating or shaving the food item by utilizing the grating surface.

Various other objects, advantages and features of the present invention will become readily apparent to those of ordinary skill in the art, and the novel features will be particularly pointed out in the appended claims.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 3 is a further illustration of a portion of the multi-purpose ice tongs, showing a knife being withdrawn from the handle of the present invention; and FIG. 4 shows the knife of the multi-purpose ice tongs fully withdrawn.

DETAILED DESCRIPTION OF THE INVENTION

The present invention pertains to a novel multi-purpose pair of ice tongs (or "ice tongs" or "tool" herein). As would be appreciated, the inventive ice tongs is intended for use by the home or professional bartender for the purpose of assisting in the preparation of drinks. Of course, the tool may be utilized by other individuals for similar or different purposes.

Figure 1:
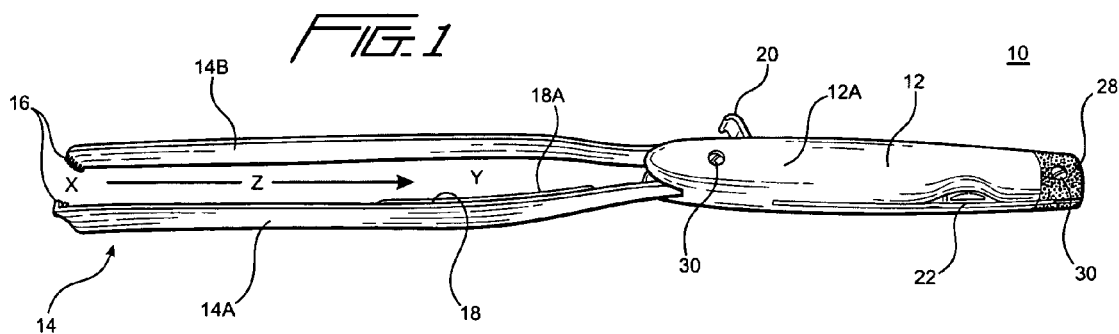
FIG. 1 illustrates an embodiment of the multi-purpose ice tongs of the present invention.
Figure 2:
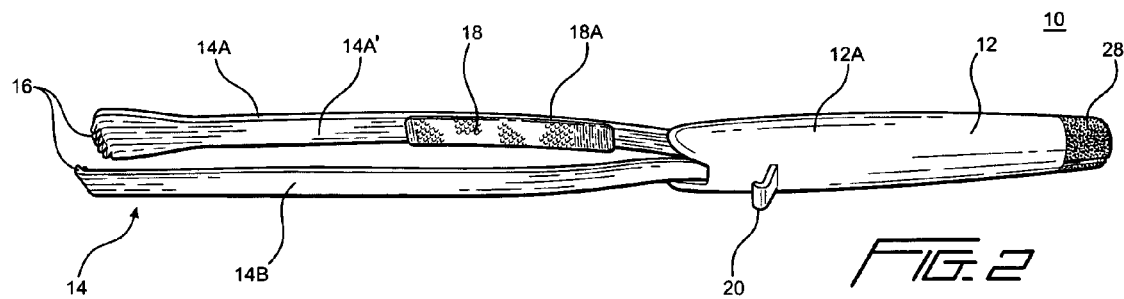
FIG. 2 is another illustration of the multi-purpose ice tongs.

Referring to FIGS. 1 and 2 of the drawings, the multi-purpose ice tongs 10 includes a handle 12 and a set of tongs 14 that extend from handle 12. Handle 12 is sufficiently long to be held by a user's hand. Tongs 14 are sufficiently long for insertion into a relatively large storage chamber containing ice cubes. Moreover, tongs 14 are sufficiently narrow in width (i.e., width of each tong) and depth (i.e., distance between the tongs) along at least a substantial portion of its length to enable tongs 14 to be inserted or extended fully into a drinking glass. Preferably, the width and depth of the tongs are sufficiently small to allow the multi-purpose ice tongs 10 of the present invention to be inserted into a champagne flute. Tongs 14 are comprised of first tong (or extension) 14A and second tong (or extension) 14B. The tongs 14A, 14B extend from one end of handle 12 and terminate with finger-like protrusions (fingers) 16 that serve to facilitate the grabbing of an ice cube between the pair of fingers.

Tongs 14A, 14B extend from and are retained by handle 12 in a sufficiently firm manner so that fingers 16 are able to grab and retain ice cubes without the need for the user to hold the tong extensions 14A, 14B. As shown in FIG. 1, an ice cube is retained by the ice tongs of the present invention at position X shown. The bartender may then place the ice cube in a drink. The ice cube, of course, can be utilized for other purposes as well. Moreover, the ice tongs 14A, 14B may be utilized to pickup other items, such as oranges and lemons and other items used in drinks and for other purposes.

Each set of fingers 16 also serve as a spoon for picking up various small items, such as olives, cherries, and other items typically served with drinks or used to make different types of drinks. Of course, fingers 16 (also called spoon 16) may be utilized to pick-up other items, as needed.

In accordance with the present invention, tong extension 14A includes a nutmeg grater (or "grater") 18 disposed along an inner interior surface 14A' (facing tong extension 14B). Grater 18 has a teeth-like surface comprised of plural mountain-like protrusions 18A that dig into nutmeg or other item upon exertion of a small force upon the item into grater 18. Grater 18 is sufficiently long, disposed along the length of tong extension 14A, to maximize efficiency. As would be appreciated, during use, nutmeg or other item to be grated is placed between tong extensions 14A and 14B, contacting grater 18, shown as position Y in FIG. 1, and the item is rubbed against grater 18 in an up and down motion.

In a particularly novel use of the set of ice tongs, ice tongs 10 of the present invention is utilized to pickup an item to be grated utilizing tongs 14A, 14B (at position X in FIG. 1), and then the user slides the ice cube from position X to position Y, maintaining the item constantly between the two ice tong extensions 14A, 14B (following path Z shown in FIG. 1), and then the picked-up item is grated utilizing grater 18, as described above. With practice, a bartender or other user of the multi-purpose ice tongs of the present invention is able to pickup and grate a food item in a remarkably short period of time.

Ice tong extensions 14A, 14B, along with fingers 16 and grater 18, are made of any suitably strong material, such as stainless steel. Other suitable materials also may be utilized. Grater 18 may be integral within tong extension 14A, or may be a distinct component suitably secured to tong extension 14A. For example, grater 18 may be a separate piece of metal that is secured (e.g., welded) in any suitably secure manner. In addition, although not shown in the drawings, a second grater may be disposed within or along the other tong extension 14B, positioned opposite or offset from grater 18. Moreover, since grater 18 is made of a suitably strong material, it also can be used to crush or shave ice. An ice cube can be crushed by placing it at location Y shown in FIG. 1 and then the two tongs 14A, 14B are squeezed to provide crushed ice. Shaved ice also can be provided by rubbing an ice cube against grater 18. Similar to that described above, an ice cube can be picked up at location X utilizing the set of tongs, then slid along path Z and then crushed or shaved at position Y.

In light of the particular design of the inventive ice tongs, only a single device is needed to carry out multiple functions. The inventive design can pickup an ice cube or other item using tong portions 14A, 14B, and grate a food item using grater 18. Additional functions can further be carried out, as discussed below.

Handle 12 includes a bottle opener 20. Bottle opener 20 includes a rounded edge and is sufficiently strong to remove bottle caps and the like. Since the multi-purpose ice tongs 10 of the present invention is designed especially for bartender use, the inclusion of bottle opener 20 on handle 10 enables the bartender and other individual to readily remove caps and covers from bottles in an easy and efficient manner.

Handle 12 further includes a knife 22 that is stored within a recess 24. As shown in FIGS. 3 and 4, knife 22 is pivotally withdrawn from handle 12, for use in the position shown in FIG. 4. Knife 22 includes a blade surface 22A for cutting fruit, vegetables and other items. By providing the multi-purpose tongs of the present invention with a knife within the tong's handle, a bartender and other individuals have a convenient tool for whatever cutting needs are necessary.

In addition to being able to cut foods and other items, knife 22 includes a zester 26, as shown in FIGS. 3 and 4. As is well known, zester 26 can provide orange and lemon peels (or peels of other items) to a drink or recipe, and can perform other functions well known in the art. Like knife 22, as well as bottle opener 20, ice tongs 14 and grater 18, zester 26 is quite useful for a bartender and other individuals making and serving drinks.

Referring back to FIGS. 1 and 2, handle 12 is designed so that it also serves the function of an ice hammer that breaks ice upon hitting, for example, an ice cube with the thicker portion 12A (also called "ice hammer" 12A) of the handle. As an ice hammer, a bartender or other individual places an ice cube or chunks of ice within the user's free hand or into a piece of fabric or other suitable material, and then forcefully breaks the ice by use of ice hammer 12 to provide crushed ice. Handle 12 is made of any suitably strong and heavy material, such as cast aluminum, stainless steel, zinc alloy, weighted wood, or reinforced and weighted synthetic material. Preferably, handle 12 is rustproof and resistant to citric acid and alcohol.

Handle 12 further includes a pillar 28, as shown in FIGS. 1 and 2, that is designed to be utilized to crush lemon, mint or sugar while holding the ice tongs of the present invention in a vertical orientation (i.e., with pillar 10 at the bottom). In accordance with the present invention, pillar 28 is made of a suitable synthetic material or wood so that it can be utilized to crush a food item disposed within a drink glass, without breaking the drink glass.

Finally, handle 12 includes a set of screws 30 to secure its two halves. However, the particular construction of handle 12 is within the ability of those of ordinary skill in the art and thus further description of the construction of handle 12 is not provided. Moreover, handle 12 can be manufactured in a manner that does not include screws.

While the present invention has been particularly shown and described in conjunction with a preferred embodiment thereof, it will be readily appreciated by those of ordinary skill in the art that various changes may be made without departing from the spirit and scope of the invention. For example, a multi-purpose ice tongs has been shown in the figures. The particular shapes and sizes of the various components shown are for illustrative purposes only and thus the multi-purpose ice tongs of the present invention may look quite different.

Therefore, it is intended that the appended claims be interpreted as including the embodiments described herein, the alternatives mentioned above, and all equivalents thereto.

What is claimed is:

1. A multi-purpose ice tongs, comprising:
    a handle;
    a pair of tongs extending from the handle, the pair of tongs having a free end with a plurality of finger-shaped protrusions extending substantially perpendicular to the tongs, the pair of tongs having a grater disposed between the finger-shaped protrusions and the handle, the pair of tongs collectively adapted to pick-up an ice cube; and
    a knife removably stored within a recess of the handle, the knife pivotally coupled to the handle.

2. The multi-purpose ice tongs of claim 1, further comprising a bottle opener extending from the handle.

3. The multi-purpose ice tongs of claim 1, wherein the handle is adapted to crush ice using a surface of the handle.

4. The multi-purpose ice tongs of claim 1, wherein the handle has a pillar at one end adapted to crush a food item.

5. The multi-purpose ice tongs of claim 4, wherein the pillar is made of a material adapted to enable crushing of a food item contained within a drink glass without breaking the glass.

6. The multi-purpose ice tongs of claim 1, wherein the pair of tongs are sufficiently narrow in size to enable the tongs to be extended into a champagne flute.

7. A multi-purpose ice tongs, comprising:
   a handle;
   a pair of tongs extending from the handle and collectively adapted to pick-up an ice cube, the pair of tongs having a free end with a plurality of finger-shaped protrusions, one of the tongs having a grating surface disposed between the finger-shaped protrusions and the handle.

8. The multi-purpose ice tongs of claim 7, wherein the grating surface is disposed on an inner surface of said one of the tongs, the inner surface of said one of the tongs facing an inner surface of the other tong.

9. The multi-purpose ice tongs of claim 8, wherein the grating surface is disposed on the inner surface of said one of the tongs at position remote from an end of said tong.

10. The multi-purpose ice tongs of claim 8, wherein the pair of tongs is adapted to enable a sliding of a picked up item along and between the tongs to the grating surface.

11. The multi-purpose ice tongs of claim 7, wherein each of the tongs includes first and second ends, the first end of each of the tongs being attached to the handle, and the second end of each of the tongs including finger-like projections for facilitating picking up of a food item.

12. The multi-purpose ice tongs of claim 7, wherein each of the tongs includes first and second ends, the first end of each of the tongs being attached to the handle, and the second end of each of the tongs including a spoon.

13. The multi-purpose ice tongs of claim 7, further comprising a bottle opener extending from the handle.

14. The multi-purpose ice tongs of claim 7, further comprising a knife removably stored within a recess of the handle.

15. The multi-purpose ice tongs of claim 7, wherein the knife is pivotally coupled to the handle, and is stored within the handle in a first position, and exposed in a second position.

16. The multi-purpose ice tongs of claim 7, wherein the knife includes a zester component adapted to remove a peel from a food item.

17. The multi-purpose ice tongs of claim 7, wherein the handle is adapted to crush ice using a surface of the handle.

18. The multi-purpose ice tongs of claim 7, wherein the handle has a pillar at one end adapted to crush a food item.

19. The multi-purpose ice tongs of claim 18, wherein the pillar is made of a material adapted to enable crushing of a food item contained within a drink glass without breaking the glass.

20. The multi-purpose ice tongs of claim 7, wherein the pair of tongs are sufficiently narrow in size to enable the tongs to be extended into a champagne flute.

21. A multi-purpose ice tongs comprising:
   a handle;
   a pair of tongs extending from the handle and collectively adapted to pick-up an ice cube; and
   a knife removably stored within a recess of the handle, the knife pivotally coupled to the handle, the knife including a zester component adapted to remove a peel from a food item, the zester component having an aperture extending fully through the knife and an indentation disposed immediately adjacent to the aperture.

* * * * *